US011513367B2

(12) United States Patent
Ulman et al.

(10) Patent No.: US 11,513,367 B2
(45) Date of Patent: Nov. 29, 2022

(54) CONTACT LENSES WITH OXYGEN-IMPERMEABLE OPTICAL FILTERS

(71) Applicant: Tectus Corporation, Saratoga, CA (US)

(72) Inventors: Morrison Ulman, Los Altos, CA (US); Ritu Raj Singh, Santa Clara, CA (US); Thomas Llewellyn Owens, Saratoga, CA (US)

(73) Assignee: Tectus Corporation, Saratoga, CA (US)

( * ) Notice: Subject to any disclaimer, the term of this patent is extended or adjusted under 35 U.S.C. 154(b) by 391 days.

(21) Appl. No.: 16/773,525

(22) Filed: Jan. 27, 2020

(65) Prior Publication Data
US 2020/0341299 A1    Oct. 29, 2020

Related U.S. Application Data

(60) Provisional application No. 62/838,191, filed on Apr. 24, 2019.

(51) Int. Cl.
*G02C 7/04* (2006.01)
*G02C 7/12* (2006.01)
*G02B 5/23* (2006.01)
*G02B 1/04* (2006.01)

(52) U.S. Cl.
CPC ............. *G02C 7/049* (2013.01); *G02B 1/043* (2013.01); *G02B 5/23* (2013.01); *G02C 7/12* (2013.01)

(58) Field of Classification Search
CPC . G02B 5/23; G02B 1/043; G02C 7/12; G02C 7/049

USPC ...................................................... 351/159.02
See application file for complete search history.

(56) References Cited

U.S. PATENT DOCUMENTS

| | | |
|---|---|---|
| 3,034,403 A | 5/1962 | Neefe |
| 3,586,423 A | 6/1971 | Zeltzer |
| 3,701,590 A | 10/1972 | Zeltzer |
| 3,877,797 A | 4/1975 | Thornton, Jr. |

(Continued)

FOREIGN PATENT DOCUMENTS

| | | |
|---|---|---|
| WO | 1992012451 A1 | 7/1992 |
| WO | 2018022735 A1 | 2/2018 |

OTHER PUBLICATIONS

A. Badawy et al., "Contact Lenses for Color Blindness", Adv. Healthcare Mater. 2018, 7, 1800152, 7 pages.

(Continued)

*Primary Examiner* — James R Greece
(74) *Attorney, Agent, or Firm* — Fenwick & West LLP (57) ABSTRACT

A scleral contact lens has a core containing an optical filter. The core and/or the optical filter may comprise oxygen impermeable material, such that an overall oxygen permeability of the core is insufficient to oxygenate a user's cornea when wearing the contact lens. To provide oxygenation to the user's cornea, the contact lens further comprises an outer covering, and an inner covering, each corresponding to a thin layer of gas-permeable material shaped to form a respective manifold between the covering and the core. Oxygen from an outside environment passes through the outer covering to reach the outer manifold, through an air path formed within the core to the inner manifold, and through the inner covering to reach the cornea of the user's eye.

20 Claims, 5 Drawing Sheets

(56) References Cited

U.S. PATENT DOCUMENTS

| | | | |
|---|---|---|---|
| 4,252,421 A | 2/1981 | Foley, Jr. | |
| 4,494,954 A | 1/1985 | Suminoe | |
| 4,826,286 A | 5/1989 | Thornton, Jr. | |
| 4,998,817 A | 3/1991 | Zeltzer | |
| 5,617,154 A | 4/1997 | Hoffman | |
| 5,774,202 A | 6/1998 | Abraham | |
| 5,846,457 A | 12/1998 | Hoffman | |
| 6,874,888 B1 | 4/2005 | Wendy | |
| 7,758,187 B2 | 7/2010 | Amirparviz | |
| 7,931,369 B2 | 4/2011 | Harris | |
| 8,770,749 B2 | 7/2014 | McCabe | |
| 8,820,923 B2 | 9/2014 | Harding | |
| 10,054,803 B2 | 8/2018 | Wold | |
| 2010/0149483 A1* | 6/2010 | Chiavetta, III | A61F 2/1613 351/159.63 |
| 2012/0277558 A1 | 11/2012 | Barber | |
| 2013/0308092 A1* | 11/2013 | Groisman | G02C 7/04 351/159.04 |
| 2014/0233105 A1 | 8/2014 | Schmeder | |
| 2018/0203257 A1* | 7/2018 | Pugh | G02C 7/047 |
| 2018/0224671 A1* | 8/2018 | Lemoff | G02C 7/047 |
| 2018/0252944 A1* | 9/2018 | Pugh | G02C 11/10 |

OTHER PUBLICATIONS

Holden et al., "Critical Oxygen Levels to Avoid Corneol Edema for Daily and Extended Wear Contact Lenses", Investigative Ophthalmology & Visual Science, v 25, p. 1161-1167, Oct. 1984.

Harvitt, D.M. et al., "Re-Evaluation of the Oxygen Diffusion Model for Predicting Minimum Contact Lens Dk/t Values Needed to Avoid Corneal Anoxia," Optometry and Vision Science, 1999, pp. 712-719, vol. 76, No. 10.

* cited by examiner

CONTACT LENSES WITH OXYGEN-IMPERMEABLE OPTICAL FILTERS

CROSS REFERENCE TO RELATED APPLICATIONS

This application claims the benefit of U.S. Provisional Application No. 62,838,191, filed Apr. 24, 2019, which is incorporated by reference in its entirety.

BACKGROUND

Technical Field

The disclosure is related to specialized contact lenses that contain oxygen-impermeable optical filters, yet when worn nevertheless transmit oxygen from the surrounding air to the cornea.

Description of Related Art

Contact lenses that provide refractive vision correction are commonplace. Most contact lenses in use today are so-called soft contact lenses. They are relatively thin and made of oxygen permeable hydrogels. Oxygen passes through the contact lens material to the cornea. Sufficient oxygen supply is an important requirement for any contact lens because, due to the lack of blood vessels within the human cornea, the tissue that makes up the cornea receives oxygen through exposure to the air. Without a sufficient flow of oxygen through the contact lens, the cornea would suffer.

Recently, there has been increased interest in contact lenses that carry additional components (referred to as a payload or payload components) to perform additional functions. However, the inclusion of additional components within the contact lens may require a thicker contact lens or a lens made with different materials, which may impact the amount of oxygen that able to be transmitted through the material of the contact lens to reach the cornea. Often, the payload itself also is not gas permeable, which further reduces the oxygen flow.

As a result, it can be challenging to provide adequate oxygenation from the external environment to the cornea, while still meeting the other requirements of the contact lens.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

A contact lens may carry a payload comprising one or more optical filters, dyes, or other components to change characteristics of light that reaches the user's eye, alter an appearance of the user's eye, and/or the like. The contact lens may be formed to have sufficient structural integrity to accommodate the payload. In addition, many payloads may comprise oxygen impermeable materials or materials having low oxygen permeability. As such, the inclusion of a payload within the contact lens may reduce an amount of oxygen that can be transmitted through the material of the contact lens to reach the cornea.

In order to ensure sufficient corneal oxygenation while maintaining sufficient structural integrity, a contact lens containing a payload may be formed as a scleral contact lens in three layers, including an outer covering, a middle structure, and an inner covering. The middle structure may contain a payload(s) and is referred to as the core. The core may comprise a material having mechanical integrity to carry the payload. In some embodiments, the core may comprise a material having poor oxygen transmissibility. The outer and inner coverings are each a thin layer of gas-permeable material, each shaped to form a respective air gap between them and the core. The two air gaps are connected by one or more air passages that traverse the core. Oxygen from an outside environment passes through the gas-permeable cap to reach the outer air gap, through the air passages to the inner air gap, and through the gas-permeable base to reach the cornea of the wearer's eye.

In some embodiments, a contact lens may contain a payload comprising one or more optical filters for compensating for the effects of red-green color vision deficiency (CVD, commonly referred to as color "blindness"). For example, the one or more filters may comprise a notch filter (also referred to as a band reject filter) that filters out light of a predetermined wavelength range, reducing an amount of light of the predetermined wavelength range that reaches the user's eye.

Figure 1:
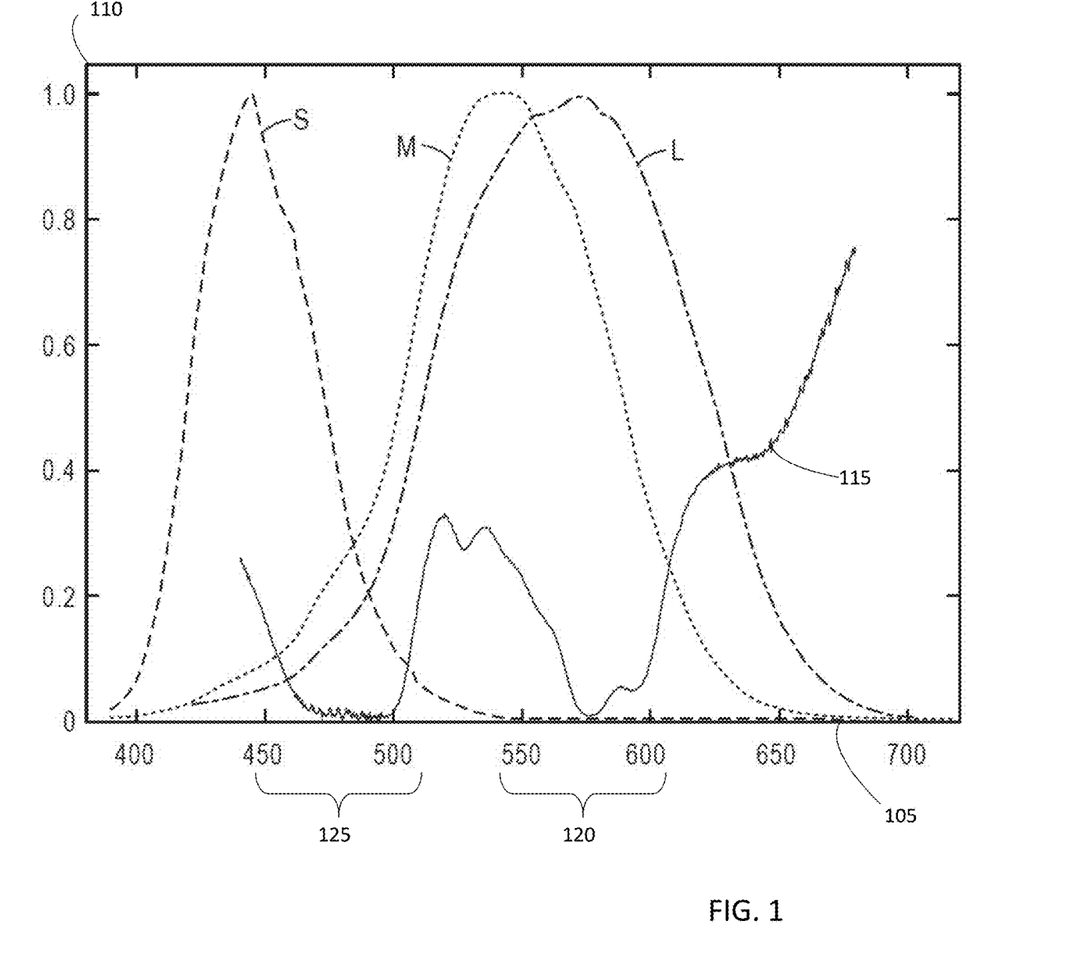
FIG. 1 illustrates a graph showing the responsiveness of cone cells in a typical human eye to light of different wavelengths, in accordance with some embodiments.

The notch filter may compensate for the effects of red-green colorblindness of the user by filtering out light of wavelengths within a range of overlap between the response curves of cones corresponding to red and green color vision in the human eye. Human eyes have three different types of cones, which are photoreceptor cells located in the retina of the eye and are responsible for color vision. Each type of cone responds differently to light of different wavelength ranges and is associated with a different color. For example, human eyes include a first type of cone that responds the most to light of longer wavelengths (designated L), a second type of cone that responds the most to light of medium wavelengths (designated M), and a third type of cone that responds the most to light of shorter wavelengths (designated S), which are associated with red, green, and blue, respectively. FIG. 1 illustrates a graph showing the responsiveness of cone cells in a typical human eye to light of different wavelengths, in accordance with some embodiments. The graph has an x-axis 105 indicating light wavelength in nanometers (nm), and a y-axis 110 indicating a responsiveness of cones cells. The curves labelled S, M and L are the responsiveness of S, M and L cones as a function of wavelength. As illustrated in FIG. 1, each type of cone (S, M, L) responds to light of a wide range of wavelengths, but exhibits peak responsiveness of light of certain wavelengths. For example, the responsiveness of S cones is peaked between about wavelengths of 420 and 440 nm, while responsiveness of M and L cones are peaked between about wavelengths of 534 and 545 nm, and 564 and 580 nm, respectively.

The graph further illustrates a response curve 115 corresponding to a notch filter that may be formed in a contact lens worn by a user that filters light that reaches the user's eye. The notch filter may filter out light in a wavelength region 120 corresponding to a region of overlap between the M and L response curves, to reduce an amount of light between the peak responsiveness of the user's M and L cones that reaches the user's eye, increasing an amount of contrast between the user's M and L response curves to improve the user's ability to differentiate between red and green light. In some embodiments, the notch filter may also filter out light in a second wavelength region 125 corresponding to a region of overlap between the S versus the M and L response curves.

Figure 2A:
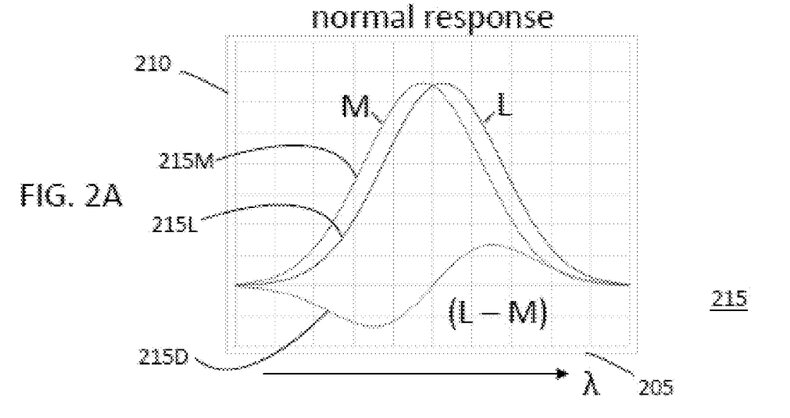
FIGS. 2A-2C illustrates graphs showing example responsiveness of M and L cones for users without red-green colorblindness and users with red-green colorblindness, in accordance with some embodiments.
Figure 2B:
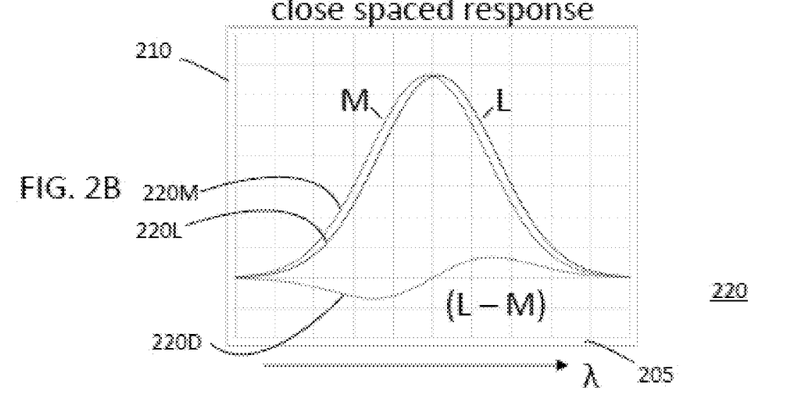
Figure 2C:
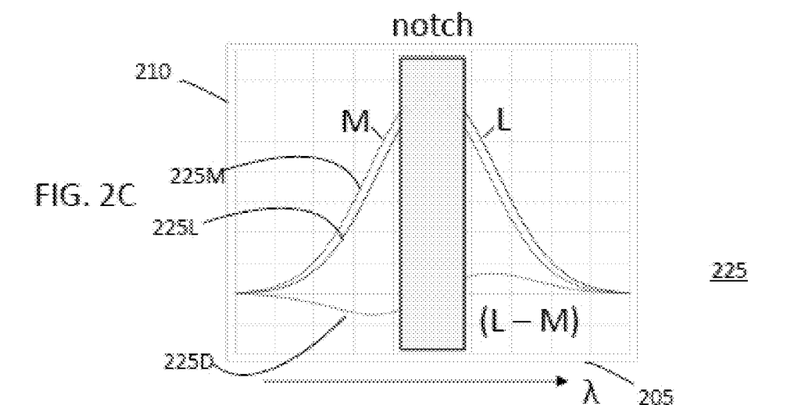

In some cases, red-green colorblindness is caused by the peak responsiveness wavelengths of a user's M and L cones being closer in wavelength than normal. FIGS. 2A-2C illustrate graphs showing how spacing between the peaks of the M and L response curves affect the ability of a user to perceive red and green colors, and how the use of a notch filter can improve red-green contrast, in accordance with some embodiments. Each graph has an x-axis 205 indicating light wavelength, and a y-axis 210 indicating a responsiveness of cones cells, and plots the responsiveness of M and L cones as a function of wavelength.

FIG. 2A illustrates a first graph 215 showing example M and L response curves (curves 215M and 215L). In addition, the first graph 215 illustrates a difference curve 215D showing a difference (L−M) in responsiveness between the M and L response curves 215M and 215L for different wavelengths of light. FIG. 2B illustrates a second graph 220 showing example M and L response curves 220M and 220L having peaks that are closer together in comparison to the curves of the first graph 215 (indicative of a user having red-green colorblindness). As shown in the second graph 220, the peaks of the responsiveness curves of the user's M and L cones are closer together, resulting in greater overlap between the M and L response curves 220M and 220L in comparison to curves 215M and 215L, and the difference curve 220D (corresponding to L−M) being closer to zero in comparison to that of the first graph 215. In perceiving colors, the human brain does not use the responsiveness of S, M, and L cones independently, but instead does so based on differences in responsiveness between different types of cones (e.g., L−M) and other functions of S, M, and L. As such, a user's red-green perceptiveness can be modelled as a function of the difference (L−M) between the M and L responsiveness curves. Thus, a user having M and L response curves that are farther apart (e.g., as illustrated in the graph 215) will be better able to distinguish between red and green colors in comparison to a user whose M and L response curves are closer together (e.g., as in the graph 220), as indicated by the larger magnitude of the difference curve 215D in comparison to that of difference curve 220D.

FIG. 2C illustrates a third graph 225 showing the example M and L response curves of the graph 220 of FIG. 2B, but where the light reaching the user's eyes has been filtered by a notch filter that eliminates light of certain wavelength ranges, in accordance with some embodiments. As illustrated in the graph 225, the notch filter filters out light of certain wavelengths where the M and L response curves of the user (225M and 225L) overlap most closely (e.g., where L−M is closest to 0 in the center of the difference curve 225D). By removing or reducing portions of the user's (L−M) curve that are closest to zero through the use of the notch filter (corresponding to light of wavelengths where the user is most unable to differentiate between red and green), the user may be able to better differentiate between red and green colored light, due to the increased contrast between their M and L response curves.

In some embodiments, other types of filters for compensating for the effects of red-green colorblindness may be used. For example, in Zeltzer (U.S. Pat. No. 3,586,423), it was recommended to fit patients with a red-transmitting contact lens in one eye only. Later, Thornton (U.S. Pat. No. 4,826,286) proposed improving color discrimination by incorporating three-band transmission filters in glasses or contact lenses. The filters were fabricated from dielectric stacks of alternating low- and high-index materials such as cryolite and ZnS. However, these references do not address how such a filter could be included in a contact lens without blocking oxygen in the air from reaching the user's cornea. In addition to oxygenation concerns, some kinds of optical filters are not mechanically flexible and are therefore incompatible with highly flexible, conventional silicone hydrogel contact lenses. Furthermore, soft contact lenses (such as silicone hydrogel contact lens), due to resting directly on the user's cornea when worn, typically need to be made from materials that are compatible with wetting by water or tears in order to comfortably adhere to the user's eye. However, many materials used in optical filters are not wettable, and thus not compatible with soft contact lenses such as silicone hydrogel contact lenses.

The inclusion of optical filters or other components (e.g., dyes, dielectric stacks, etc.) within a contact lens may affect the ability of the contact lens to transmit oxygen to the cornea of the user's eye. Conventional contact lenses are designed to transmit oxygen to the cornea by optimizing (1) material characteristics and (2) lens thickness. As an example of how oxygen transmission through contact lenses is specified, a contact lens structure might be constructed from a material having an oxygen permeability of approximately $$Dk \cong 100 \times 10^{-11} \left(\frac{cm^2}{sec}\right)\left(\frac{ml_{O_2}}{ml}\right)\left(\frac{1}{mmHg}\right),$$

commonly quoted as Dk="100", where D is the oxygen diffusion coefficient measured in $$\left(\frac{cm^2}{sec}\right),$$

and k is the oxygen solubility in the material expressed as concentration of $O_2$ per unit of $O_2$ partial pressure measured in $$\left(\frac{ml_{O_2}}{ml}\right)\left(\frac{1}{mmHg}\right).$$

A 200 μm thickness of this material would have oxygen transmissibility $$Dk/t \cong 50 \times 10^{-9} \left(\frac{cm}{sec}\right)\left(\frac{ml_{O_2}}{ml}\right)\left(\frac{1}{mmHg}\right),$$

commonly quoted as Dk/t="50", where t corresponds to the thickness of the material. Generally, an oxygen transmissibility of Dk/t="24" is the minimum recommended for daily wear contact lenses, while an oxygen transmissibility of Dk/t="87" is the minimum recommended for extended wear lenses in contact with the cornea. See, e.g., Holden and Mertz, Investigative Ophthalmology and Visual Science 25:1161-1167, 1984. Dk may be measured in Barrers, where $$1\ Barrer = 10^{-10} \frac{cm_{STP}^3 \cdot cm}{cm^2 \cdot sec \cdot cmHg} =$$

$$10^{-11} \frac{cm_{STP}^3 \cdot cm}{cm^2 \cdot sec \cdot mmHg} = 10^{-11} \left(\frac{cm_{STP}^3}{cm^3}\right)\left(\frac{cm^2}{sec}\right)\left(\frac{1}{mmHg}\right),$$

and $cm_{STP}^3$ refers to the number of gas molecules that occupy one cubic centimeter (1 cc) at STP (standard temperature and pressure) according to the ideal gas law.

Conventional contact lenses are typically made of an oxygen permeable material such as silicone hydrogels. These lenses are thin, flexible, and provide adequate corneal oxygenation, due to the ability of oxygen to permeate through the material of the contact lens to reach the user's cornea. However, many optical filters are constructed using materials that are impermeable to oxygen (e.g., materials having oxygen permeability below a threshold level), and as such cannot be incorporated in a conventional contact lens without seriously risking eye health. For example, the inclusion of an oxygen-impermeable notch filter within a silicone hydrogel contact lens would block oxygen from permeating though the silicone hydrogel material to reach the user's cornea. In addition, in order to support the filter, the contact lens may be made of a more rigid material, which may prevent the contact lens from having the flexibility and ability to absorb tear fluid needed by soft contact lenses such as silicone hydrogel lens to be worn comfortably by the user.

In some embodiments, in order to accommodate an oxygen-impermeable payload, such as a notch filter or other optical component, a scleral contact lens may have structures to maintain rigidity while facilitating transmission of oxygen to the user's cornea, allowing the contact lens to support the payload while also providing sufficient oxygenation to the user's cornea. For example, the scleral contact lens may be constructed in multiple layers and including one or more pathways allowing for transmission of oxygen from the external environment to the user's cornea. Because scleral contact lenses are designed to be mounted on the sclera of the user's eye and vault over the user's cornea instead of resting on the user's cornea, they may be rigid in structure and comprise materials that do not absorb liquids such as tear fluid, in contrast to silicone hydrogel lenses.

Figure 3:
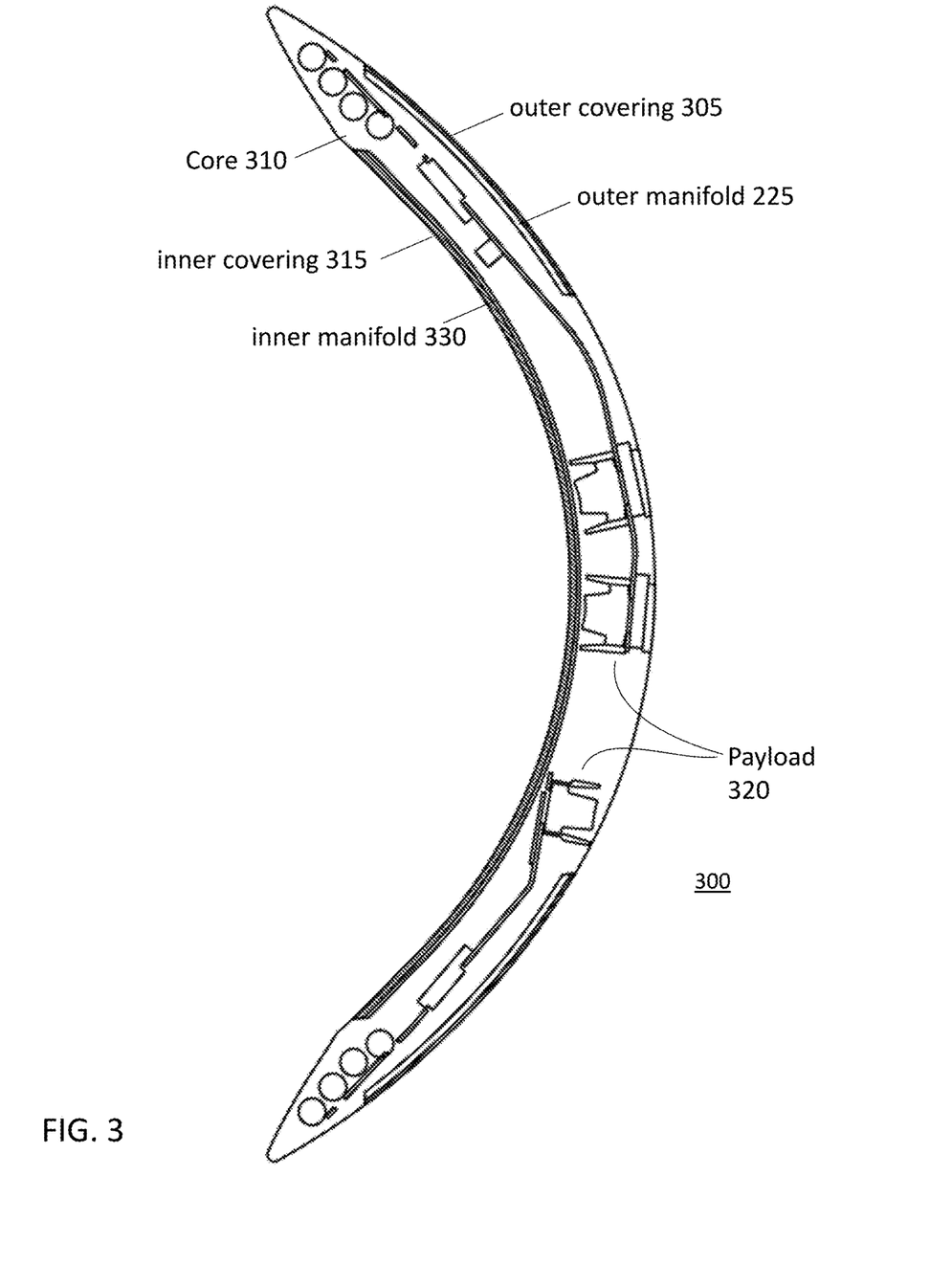
FIG. 3 illustrates a side cross-sectional view of a multilayer scleral contact lens, in accordance with some embodiments.

FIG. 3 illustrates a side cross-sectional view of a multi-layer scleral contact lens. The contact lens 300 is constructed from three layers, including an outer covering 305, a middle structure (or core) 310, and an inner covering 315. The core 310 contains a payload(s) 320, and may comprise a material having mechanical integrity to carry the payload 320. In some embodiments, the core 310 may comprise a material having poor oxygen transmissibility, such as poly(methyl methacrylate) (PMMA). The outer covering 305 and inner covering 315 may each be formed from a rigid gas permeable material.

A portion of the outward-facing (i.e., facing the external environment) surface of the core 310 is covered by the outer covering 305 in areas that are exposed to ambient oxygen in the external environment. The inner covering 315 covers an inward-facing surface of the core over the user's cornea. When worn by a wearer, the outer covering 305 faces the outside environment, while the inner covering 315 is proximate to the wearer's cornea (e.g., close to the user's cornea but separated by a thin tear layer, such that the inner covering 315 does not directly touch the user's cornea). In some embodiments, the outer covering 305 has an annular shape, such that it does not cover a center area of the contacts lens 300.

The outer covering 310 and inner covering 315 are each a thin layer of gas-permeable material, each shaped to form a respective interstitial cavity between them and the core (also referred to as "air gaps" or "manifolds"), e.g., the outer manifold 325 formed between the outer covering 305 and the core 310, and the inner manifold 330 formed between the inner covering 315 and the core 310). The outer and inner manifolds are connected by an air path (e.g., air shafts) that traverses the core (not shown in FIG. 3). Oxygen from the outside environment diffuses through the gas-permeable outer covering 305 to reach the outer manifold 325, through the air path to the inner manifold 330, and diffuses through the gas-permeable inner covering 315 to reach the cornea of the wearer's eye.

Oxygen diffusion through the air (such as in the manifolds 325, 330 and the air path formed within the core 310) is roughly 100,000 times more rapid than diffusion through permeable solids such as rigid gas permeable ("RGP") plastic. As a result, the oxygen transmissibility of the contact lens 300 is defined primarily by the thicknesses and materials of the two coverings 305, 315, and not by the thickness of the manifolds 325 and 330, the air path, or the core 310. The oxygen transmissibility "Dk/t" of the entire contact lens 300 may be approximated based upon the Dk/t of the areas of the outer covering 305 and inner covering 315 overlapping the outer manifold 325 and inner manifold 330, respectively, and not on the thickness or material of the core 310. The thickness and material of the core 310 may be selected to accommodate a desired payload and provide sufficient structural strength to support the payload.

In some embodiments, such as that illustrated in FIG. 3, the payload 320 of a multi-layer scleral contact lens may comprise one or more electronic components. An example of a multi-layer scleral contact lens designed to carry electronic payloads is described by Lemoff (U.S. Pat. No. 10,095,051), which is hereby incorporated by reference in its entirety. In order to accommodate the electronic component payload, the contact lens 300 may be as thick as one millimeter or more.

Figure 4:
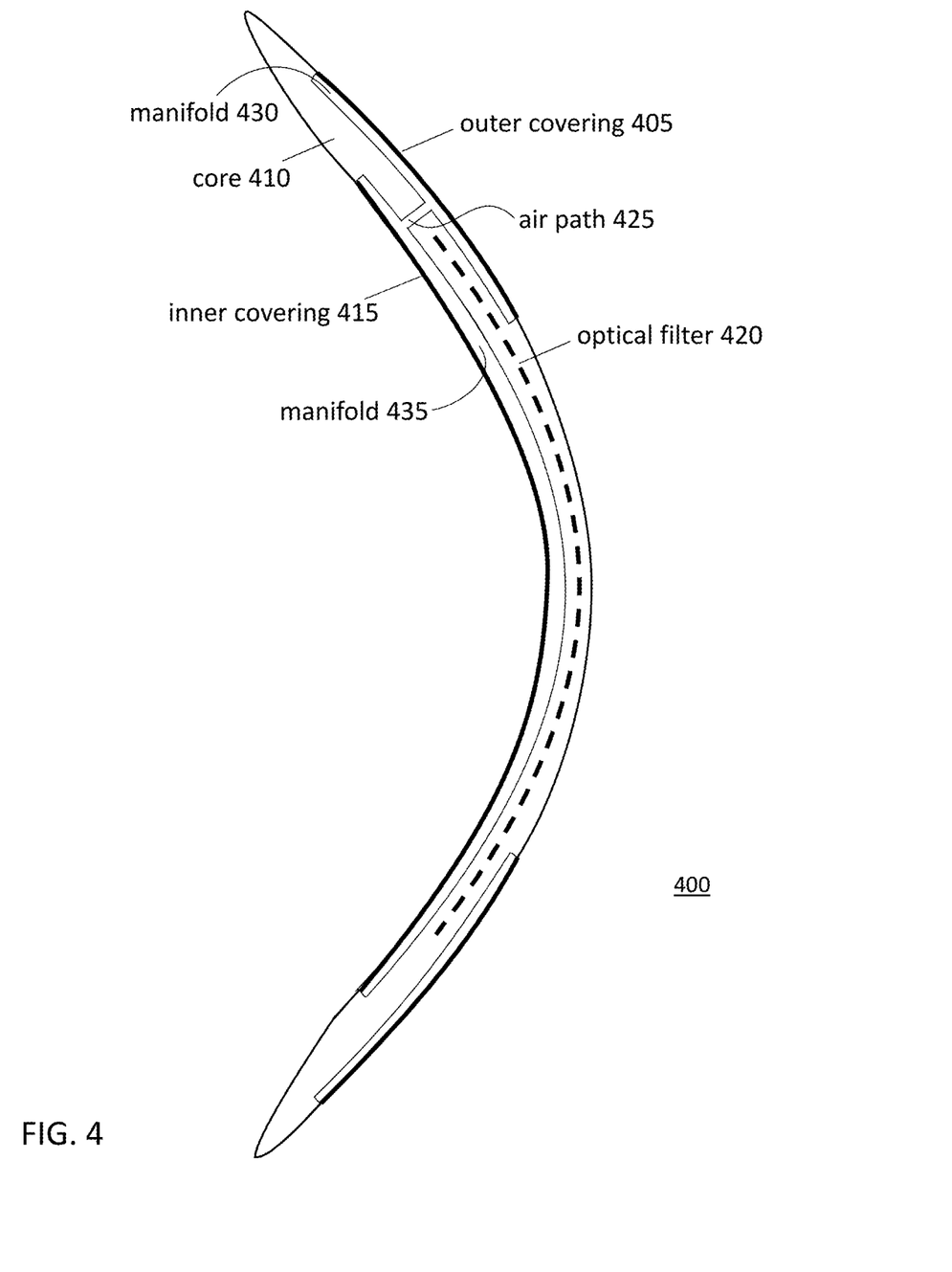
FIG. 4 shows a cross-sectional view of a contact lens including an oxygen-impermeable optical filter.

While FIG. 3 illustrates a multi-layer scleral contact lens formed having a thick core (e.g., >500 μm thick) in order to accommodate the thickness of an electronic payload. In other embodiments, a multi-layer scleral contact lens may be made constructed in which the oxygen impermeable core layer is only 100-200 μm thick. FIG. 4 illustrates a cross-sectional view of a contact lens including an oxygen-impermeable optical filter, in accordance with some embodiments. The optical filter 420 may be a notch filter configured to compensate for the effects of red-green colorblindness, such as that discussed with relation to FIGS. 1A and 1B, or some other type of optical filter, and comprise a non-oxygen permeable material. The contact lens 400 may be similar in thickness to a conventional silicone hydrogel contact lens. For example, the optical filter 420 may have a thickness of less than 50 μm, while the core 410 may have a thickness of less than 250 μm. In some embodiments, the scleral contact lens 400 may have a thickness of less than 500 μm. However, due to the presence of the optical filter 420 formed from oxygen impermeable material within the core 410, the core material may be not sufficiently permeable to oxygen to adequately oxygenate the user's cornea. In other words, in contrast to a scleral contact lens carrying large electronic payloads (such as that illustrated in FIG. 3), in which poor oxygen permeability of the core may be due in large part to the thickness of the core needed to accommodate the payload, the scleral contact lens of FIG. 4 containing an optical filter may be no thicker than a conventional scleral lens. However, because the optical filter comprises materials having low oxygen permeability and covers a large area within the core over the user's cornea (in order to intercept light reaching the user's retina), the overall permeability of the contact lens core may not be sufficient to oxygen the user's cornea, despite being no thicker than a conventional scleral lens.

To ensure adequate oxygenation of the user's cornea when wearing the contact lens 400, the contact lens 400 comprises an outer covering 405 and an inner covering 415 that are shaped to form respective manifolds 430 and 435 between them and the core 410, similar to the outer covering 305 and inner covering 315 illustrated in FIG. 3. The manifolds 430 and 435 corresponding to the outer covering 405 and inner covering 415 are connected by an air path 425 formed within and traversing the core 410, allowing for oxygen from the external environment to diffuse through the outer covering 405 to reach an outer manifold 430, and travel through pathways defined by the air path 425 to reach the inner manifold 435, from which the oxygen can diffuse through the inner covering 415 to reach the user's cornea. Although FIG. 4 illustrates a single air path 425 traversing the core 410, it is understood that multiple air paths may be formed within the core 410 to connect the outer and inner manifolds 430 and 435. In some embodiments, such as that illustrated in FIG. 4, the air path 425 may be formed to be substantially orthogonal to the outer surface of the portion of core 410 on which it is formed, although in other embodiments, the air path 425 may have a different orientation. In addition, while the above description refers to an outer manifold defined between the outer covering 405 and the core 410, and an inner manifold defined between the inner covering 415 and the core 410, it is understood that in some embodiments a covering and the core may be formed to define multiple manifolds between them. For example, the outer covering 405 and the core 410 may define multiple outer manifolds between them, each connected to the inner manifold by a respective air path 425.

By forming the contact lens with a core, outer covering, inner covering, and air shafts traversing the core to connect respective manifolds formed between the core and the outer and inner coverings, the oxygen transmissibility "Dk/t" of the entire contact lens 400 may be approximated based upon the Dk/t of the areas of the outer covering 405 and inner covering 415 overlapping the outer and inner manifolds, respectively. As such, the contact lens 400 may be able to provide adequate oxygenation to the user's cornea, regardless of the oxygen permeability of the core 410 or the components contained within (e.g., the optical filter 420). Thus, the core 410 may be constructed such that an overall oxygen permeability of the core 410 is insufficient to oxygenate the user's cornea, where corneal oxygenation is provided by the diffusion of oxygen through the outer covering, outer manifold, air paths, inner manifold, and inner covering. For example, even though the optical filter 420 within the core 410 may comprise oxygen impermeable materials (e.g., material having oxygen permeability below a threshold value), such that an amount of oxygen that would be able to permeate through the overall material of the core 410 would be insufficient to oxygenate the user's cornea, sufficient oxygen to the user's cornea is provided by the pathways that comprise the coverings, manifolds, and air paths of the contact lens.

In some embodiments, the optical filter 420 is formed in an area of the core 410 to cover a central zone of the contact lens 400, while the air paths 425 are formed in a portion of the core 410 outside the central zone (e.g., a peripheral zone). The central zone may refer to an area of the contact lens that overlaps the cornea of the user's eye, while the area of the contact lens outside the cornea is referred to as the peripheral zone. Because cornea size varies between different users, for convenience, the central zone may be defined using a predetermined value. For example, because the diameter of the boundary between the cornea and the sclera is typically between 10 and 12.5 mm, the central zone may be defined as the 10 mm diameter center area of the contact lens (i.e., within 5 mm radius of the center axis of the contact lens). Components of the contact lens 400 configured to affect light that reaches the users' retina (e.g., the optical filter 420) typically will be located within the central zone due to the required optical path. Conversely, structures not intended to interact with the retina (e.g., the outer covering 405, air path 425, etc.) may be located on the edge of the central zone or outside the central zone when possible, so that they do not block or otherwise affect light reaching the retina.

In some embodiments, in order to ensure that light reaching the user's cornea passes through the optical filter 420, the optical filter 420 may comprise a layer of the core covering the entire central zone, or extend outside the central zone of the contact lens (e.g., have a radius greater than that of the central zone) into the peripheral zone. In some embodiments, in order to achieve a necessary surface area to provide sufficient oxygenation to the cornea, the outer covering 405 and outer air gap of the contact lens may extend into the central zone. As such, in some embodiments, such as that illustrated in FIG. 4, an outer region of the optical filter 420 may be disposed between the outer covering 405 and the inner covering 415. As used herein, an outer region of the optical filter 420 may refer to a region of the optical filter at least a threshold distance from the central axis of the contact lens 400. In some embodiments, the threshold distance may correspond to a distance defining the central zone of the contact lens, such that the outer region of the optical filter 420 corresponds to portions of the optical filter 420 within the peripheral zone. In other embodiments, the threshold distance defining the outer region of the optical filter 420 may be different from the distance defining the central zone.

In some embodiments, the air path 425 is formed in a portion of the core 410 outside a boundary of the optical filter 420, to avoid the air path 425 from affecting light passing through the optical filter 420. In other embodiments, air path 425 may traverse through an outer region of the optical filter 420.

Although FIG. 4 illustrates the optical filter 420 as formed within the core 410 (e.g., as a layer within the core 410), in other embodiments, the optical filter 420 may be implemented in different forms. For example, in some embodiments, the optical filter 320 may be formed an outermost layer of the core 410 and defining at least a portion of an outer surface of the core 410 (e.g., such that at least a portion of the optical filter 420 not overlapping with the outer covering 305 is exposed to an external environment), as an innermost layer of the core 410 (e.g., such that at least a portion of the optical filter 420 faces an inner surface of the inner covering 415), and/or the like. For example, in some embodiments, the core may comprise a substrate (e.g., glass, plastics, etc.), wherein the optical filter is formed as a thin coating or series of coatings deposited on a surface of the substrate. In some embodiments, the core 410, in addition to containing the optical filter 420, is configured to provide optical refractive correction. In other embodiments, optical refractive correction may be provided by the inner covering instead of or in addition to the core. In some embodiments, the core 410 may consist primarily of the optical filter 420. For example, the optical filter 420 may be implemented as a structure that serves as the core 410, with the outer covering 405 and inner covering 415 mounted thereon, with little or no additional structure forming the core 410.

Figure 5:
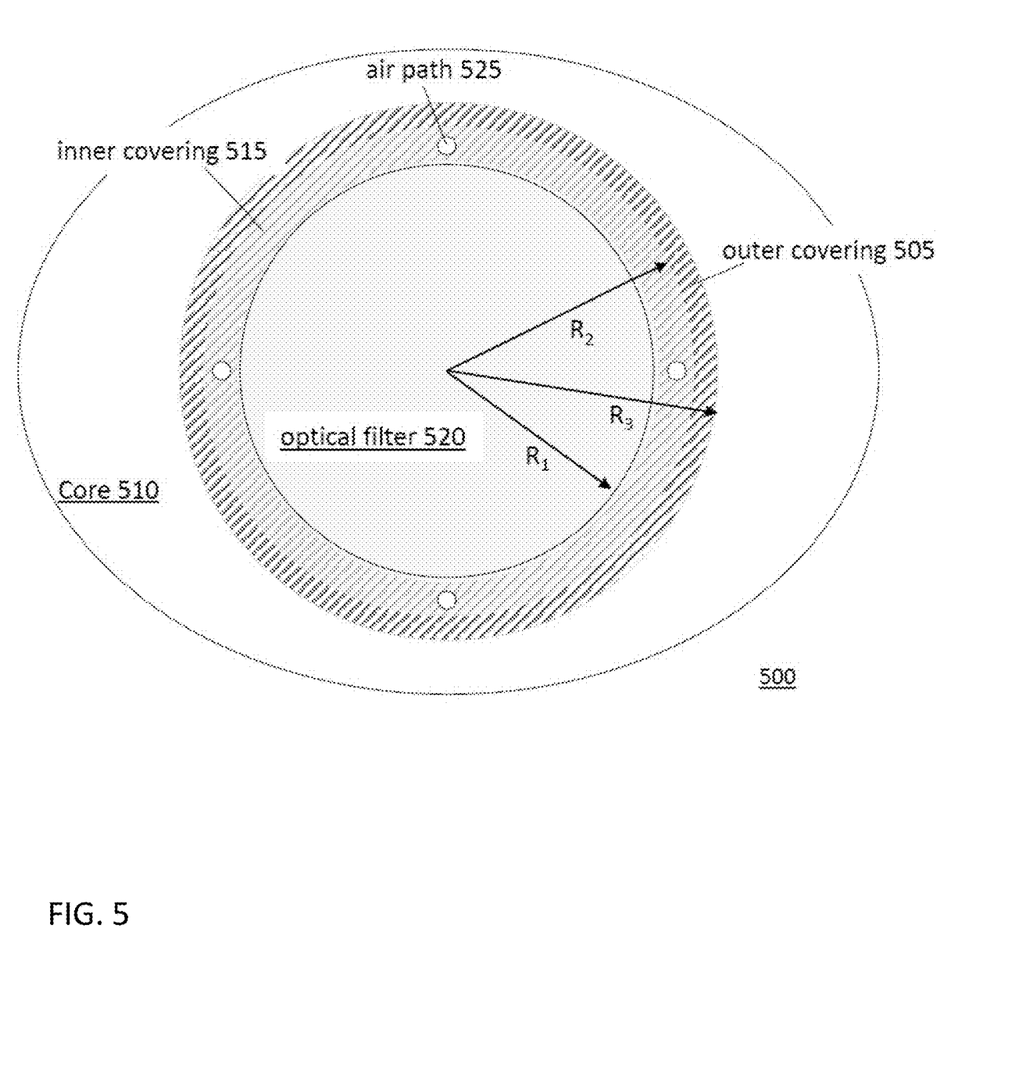
FIG. 5 shows a plan view of a contact lens including an oxygen-impermeable optical filter.

FIG. 5 illustrates a plan view of a contact lens including an oxygen-impermeable optical filter, in accordance with some embodiments. The contact lens 500 illustrated in FIG. 5 corresponds to a top-down view of the contact lens 400 illustrated in FIG. 4, comprising a core 510, outer covering 505, and inner cover 515, wherein the outer and inner coverings form respective outer and inner cavities between themselves and the core 510 connected by a plurality of air paths 525 (corresponding to the core 410, outer covering 405, inner covering 416, and air paths 425 of FIG. 4).

The optical filter 520 of the contact lens 500 may cover an area of the contact lens 500 within a radius $R_1$ of the central axis of the contact lens 500. In some embodiments, the radius $R_1$ may correspond to a radius of the central zone (e.g., 5 mm). In other embodiments, the radius of the central zone is less than $R_1$, indicating that the optical filter 520 covers an area of the contact lens 500 larger than the central zone.

In some embodiments, the outer covering 505 is configured to cover an area on the outer surface of the core 510 outside the central zone. For example, as illustrated in FIG. 5, the outer covering 505 covers at least an area of the core 510 between an inner radius $R_1$ and an outer radius $R_3$. In some embodiments, the inner and outer radii of the outer covering 505 are selected such that the outer covering 505 has a surface area sufficient to oxygen the cornea of the user. In addition, although FIG. 5 illustrates the inner radius of the outer covering 505 as $R_1$, such that the outer covering 505 does not laterally overlap with the optical filter 520, the inner radius of the outer covering 505 may be less than $R_1$, in which the outer covering 505 and the optical filter 520 partially overlap (e.g., as illustrated in FIG. 4).

The inner covering 515 covers an area on an inner surface of the core 510 within a radius $R_2$. As the inner covering 515 is configured to cover the cornea of the user when the contact lens 500 is worn, the radius $R_2$ may be selected based upon an expected cornea size of the user, such that the inner cover 515 spans over the entire cornea of the user. In addition, $R_2$ may be selected to be greater than the inner radius of the outer covering 505 (e.g., $R_1$), such that the inner covering 515 and the outer cover 505 partially overlap (e.g., in the region between $R_1$ and $R_2$).

The air paths 525 may be formed in the core 510 within the region of overlap between the outer covering 505 and the inner covering 515 (between $R_1$ and $R_2$), connecting the outer air gap formed under the outer covering 505 and the inner air gap formed above the inner covering 515. In addition, the air paths 525 may be formed outside the boundary of the optical filter 520, to minimize interference of the air paths 525 on light travelling through the optical filter 520 to reach the user's cornea.

Although FIG. 5 illustrates $R_2$ as being less than $R_3$, in some embodiments, the radius $R_2$ may be greater than $R_3$. In addition, the lens example illustrated in FIG. 5 has an oval shape, but suitable lenses may also be circular in other embodiments.

A scleral contact lens can be formed to have a thin, oxygen impermeable core that comprises payload components (e.g., optical filters) that can serve a variety of purposes. For example, in some embodiments, the oxygen impermeable core of the contact lens may comprise one or more absorptive light filters, one or more polarizing elements, one or more tinting elements to create tinted contact lenses, one or more optical filters to aid health professionals in identifying health risks associated with the eye (e.g., spotting subcutaneous veins), one or more optimized optical filters for compensating color blindness, one or more special filter dyes, and/or the like. In some embodiments, the oxygen impermeable core may comprise, as examples, a:

(a) dielectric stack (or Bragg) optical filter,
(b) absorptive optical filter,
(c) absorptive H-sheet polarizer,
(d) absorptive silver nanoparticle polarizer,
(e) wire grid polarizer,
(f) photochromic layer, such as a silver halide glass photochromic layer, or oxazine, naphthopyran or other plastic photochromic layer,
(h) dye (e.g. Rhodamine),
(i) painted or patterned layer for aesthetic purposes,
(j) optical neutral density filter,
(k) quantum dots or other quantum confined structures, or any combination of the above.

A filter or other optical component designed for a scleral contact lens may in some aspects be simpler than one designed for eyeglasses because the scleral contact lens, when mounted on the user's eye, remains in a fixed orientation with respect to the user's retina, even as the user moves his/her eye. On the other hand, a filter designed for eyeglasses should accommodate an eye looking through the glasses lens at a variety of angles.

In some embodiments, the oxygen impermeable core may be constructed using layers of different materials. For example, the core may comprise a plurality of layers, wherein the optical filters correspond to a layer of the core disposed between a first layer and a second layer of the plurality of layers. The first and second layers may comprise supporting material such as a plastic (e.g., PMMA), a glass, or other substrate material, or may comprise additional filters or optical components of the core. In some embodiments, an optical filter may be implemented as a coating or lamination on a surface of a core material (e.g., a substrate such as plastic, glass, etc.). In other embodiments, the optical filter may be implemented as particles (e.g., filter particles, dye particles) embedded within the core material of the contact lens.

In some embodiments, an optical filter may be implemented as a dielectric stack mirror with a plurality of layers (e.g., each having quarter wavelength thickness to reflect light with particular wavelength ranges). As an example, a contact lens designed to compensate for certain kinds of color blindness may include an oxygen impermeable dielectric stack optical filter in its core layer. In some embodiments, such a dielectric stack may be made from as many as 200 layers, and may be only about 10 microns thick, functioning as a multi-wavelength notch filters.

In some embodiments, a contact lens designed for laser safety may include an oxygen impermeable dielectric stack optical notch (band reject) filter centered at the laser wavelength. Dielectric stack filters in this and the previous example may be made from alternating layers of a low index material such as silicon oxide (n=1.4) and a high index material such as titanium dioxide (n=2.87), as examples. In other embodiments, Cryolite and ZnS may be use as another pair of high and low index materials for forming a dielectric stack.

In some embodiments, a notch filter, such as those described above, may be implemented using one or more dyes or fluorophores. For example, the filter may comprise a fluorophore selected to absorb or block light within a desired wavelength range (e.g., absorb/block light corresponding to the overlap band of red and green receptors), such as Abberior Flip 565, a dye having an absorption band from 535 to 574 nm FWHM. Typical fluorophores may have a molar extinction coefficient of between 10000 $M^{-1}$ $cm^{-1}$ and 100000 $M^{-1}$ $cm^{-1}$, which translates to fluorophore doping concentration requirement in the core material in the range of 6.7 mmoles/liter to 0.67 mmoles/liter, for a core thickness of 300 um and blocking requirement of optical density 2 (OD2), in which the intensity of light transmitted by the filter in comparison to intensity of light incident on the filter is $10^{-2}$ (or 1%).

In some embodiments, a contact lens designed for seeing objects below the surface of water may include an oxygen impermeable polarizing layer such as an H-sheet polarizer or wire grid polarizer.

In some embodiments, a contact lens designed to improve a wearer's appearance may include an optically opaque, oxygen impermeable layer with an image of an iris rendered on it (e.g., an artificial iris painted or coated on a core substrate). For example, the contact lens may be used to alter an eye color of the user.

In some embodiments, the contact lens may comprise multiple layers corresponding to different filters or optical components. For example, a contact lens designed to compensate for certain kinds of color blindness may include an oxygen impermeable dielectric stack optical filter and a separate photochromic layer in its core. This lens compensates for color blindness in both indoor and outdoor lighting conditions, due to the ability of the photochromic layer to darken when exposed to light of above a threshold intensity. The photochromic layer may comprise one or more photochromic materials, such as oxazine, naphthopyran, polymerizable naphthoxazines; polymerizable spirobenzopyrans; polymerizable spirobenzopyrans and spirobenzothiopyrans; polymerizable fulgides; polymerizable naphthacenediones; polymerizable spirooxazines; polymerizable polyalkoxylated naphthopyrans; and polymerizable photochromic compounds. The different filters or optical components may be deposited as layers on a substrate material. In addition, the filter/optical component layers may be sandwiched between additional layers within the core (e.g., substrate layers or other filter/optical component layers). In some embodiments, the layers corresponding to different filters or optical components may be formed directly adjacent to each other, or may be separated by one or more substrate layers.

More examples involving other oxygen-impermeable optical filters will be apparent to those skilled in the art.

The foregoing description of the embodiments of the invention has been presented for the purpose of illustration; it is not intended to be exhaustive or to limit the invention to the precise forms disclosed, but merely illustrates different examples. It should be appreciated that the scope of the disclosure includes other embodiments not discussed in detail above. Persons skilled in the relevant art can appreciate that many modifications and variations are possible in light of the above disclosure, without departing from the spirit and scope as defined in the appended claims. Therefore, the scope of the invention should be determined by the appended claims and their legal equivalents.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A scleral contact lens that mounts to a sclera of an eye, the scleral contact lens comprising:
   a core comprising an optical filter covering a central area of the contact lens, wherein an oxygen permeability of the core is insufficient to oxygenate the cornea;
   a gas-permeable inner covering and inner manifold beneath the core, the inner covering disposed over the cornea of the eye;
   a gas-permeable outer covering and outer manifold, the outer covering exposed to oxygen in the external environment; and
   at least one oxygen pathway traversing the core from the outer manifold to the inner manifold.

2. The scleral contact lens of claim 1 wherein the central area of the contact lens consists of an area of the contact lens that is within a threshold distance of a central axis of the contact lens.

3. The scleral contact lens of claim 1 wherein the central area of the contact lens includes an area of the contact lens that is within 5 mm of a central axis of the contact lens.

4. The scleral contact lens of claim 1 wherein the optical filter has a thickness of not more than 50 μm.

5. The scleral contact lens of claim 1 wherein the core has a thickness of not more than 250 μm.

6. The scleral contact lens of claim 1 wherein the core consists of the optical filter.

7. The scleral contact lens of claim 1 wherein an outer surface of the optical filter is exposed to the external environment.

8. The scleral contact lens of claim 1 wherein the optical filter is embedded within the core.

9. The scleral contact lens of claim 1 wherein the core comprises a plurality of layers, and wherein the optical filter comprises a layer of the core disposed between a first layer and a second layer of the plurality of layers.

10. The scleral contact lens of claim 1 wherein an outer region of the optical filter is disposed between the outer manifold and the inner manifold, and the at least one oxygen pathway traverses through the outer region of the optical filter.

11. The scleral contact lens of claim 1 wherein an outer region of the optical filter is disposed between the outer manifold and the inner manifold, and wherein the at least one oxygen pathway is disposed within the core outside the central area occupied by the optical filter.

12. The scleral contact lens of claim 1 wherein the core further provides optical refractive correction.

13. The scleral contact lens of claim 1 wherein the outer covering and the optical filter within the core are laterally non-overlapping.

14. The scleral contact lens of claim 1 wherein the optical filter comprises a notch filter configured to block light within a predetermined wavelength range.

15. The scleral contact lens of claim 14 wherein the optical filter comprises a dielectric stack filter comprising a plurality of layers.

16. The scleral contact lens of claim 14 wherein the optical filter comprises a dye configured to block light of a particular wavelength.

17. The scleral contact lens of claim 1 wherein the optical filter comprises a polarization filter.

18. The scleral contact lens of claim 1 wherein the optical filter comprises a photochromic layer.

19. A scleral contact lens that mounts to a sclera of an eye, the lens comprising:

a core having an outer surface that faces outwards away from the eye, an inner surface that faces inwards towards a cornea of the eye, and a base surface that mounts to the sclera;

a gas-permeable outer covering over the core's outer surface, the outer covering and the core's outer surface forming an outer air gap therebetween that receives oxygen from the external environment through the gas-permeable outer covering; and, a gas-permeable inner covering under the core's inner surface and disposed over the cornea of the eye, the inner covering and the core's inner surface forming an inner air gap therebetween that passes oxygen to the cornea of the eye through the gas-permeable inner covering;

wherein the core contains an air path traversing the core from the outer air gap to the inner air gap and the core contains an oxygen impermeable optical filter.

20. The scleral contact lens of claim 19 wherein the optical filter comprises at least one of: a dielectric stack optical filter; an absorptive optical filter; an absorptive H-sheet polarizer; an absorptive silver nanoparticle polarizer; a wire grid polarizer; a silver halide glass photochromic layer; an oxazine, naphthopyran or other plastic photochromic layer; a dye; a painted or patterned layer for aesthetic purposes; an optical neutral density filter; quantum dots or other quantum confined structures.

* * * * *